United States Patent [19]
Stier

[11] 3,850,052
[45] Nov. 26, 1974

[54] DEVICE FOR ADJUSTING THE END FEED POSITION OF OSCILLATING FEED MECHANISMS

[75] Inventor: Ott Stier, Graetersteig, Germany

[73] Assignee: Vollmer Werke Maschinenfabrik GmbH

[22] Filed: Jan. 15, 1974

[21] Appl. No.: 433,457

[30] Foreign Application Priority Data
Jan. 16, 1973  Germany.............................. 7301530

[52] U.S. Cl. ........................................ 76/77, 76/35
[51] Int. Cl. ............................................ B23d 51/16
[58] Field of Search ................................. 76/77, 35

[56] References Cited
UNITED STATES PATENTS
| | | | |
|---|---|---|---|
| 1,853,245 | 4/1932 | Wardwell................................ | 76/35 |
| 2,343,171 | 2/1944 | Collier..................................... | 76/77 |

Primary Examiner—Leonidas Vlachos
Attorney, Agent, or Firm—Hill, Gross, Simpson, Van Santen, Steadman, Chiara & Simpson

[57] ABSTRACT

A device for adjusting the end feed position of a feed pawl mechanism for saw sharpening machines and the like having a rock shaft carrying a driving arm and a pawl carrying idler arm with a coarse and fine thread adjustment screw mechanism on the driving arm engaging and driving the idler arm to accurately position the end of the driving stroke of the pawl for accommodating variations in tooth pitch and contours of successive saws to be sharpened. A tension spring biases the idler arm against the end of the adjusting screw mechanism and a first control knob on this screw mechanism provides for coarse adjustment of the position of the idler arm relative to the driving arm while a second knob provides for a micrometer adjustment of the idler arm position.

7 Claims, 2 Drawing Figures

DEVICE FOR ADJUSTING THE END FEED POSITION OF OSCILLATING FEED MECHANISMS

BACKGROUND OF THE INVENTION

Field of the Invention

This invention pertains to the art of adjusting or altering the end feed position of oscillating feed mechanisms such as are used in saw sharpening machines and the like. Specifically the invention deals with a pawl mechanism driving a circular saw to be sharpened and having a screw rod and sleeve assembly quickly and accurately controlling the end feed position of the pawl.

Feed mechanisms capable of altering the stroke of a feed pawl drive for saw sharpening machines are known but adjustment of the end feed position of the pawl to accommodate variations in tooth pitches and tooth shapes of successive saws to be sharpened required cumbersome screw mechanisms which had to be rotated through many revolutions to accommodate any wide variations in tooth pitches and tooth shapes of successive saws. The adjustment of these prior known feed mechanisms was time consuming and not very accurate.

SUMMARY OF THE INVENTION

The present invention now provides a rapidly manipulated screw adjustment having great accuracy for controlling the end feed position of the feed pawl of a reciprocating feed mechanism such as is used in saw sharpening machines. The device of this invention includes a coarse externally threaded bushing threaded through the driving arm or lever of the feed mechanism and slideably supporting an internal bolt held against rotation relative to the bushing. A pin is threaded into the inner end of the bolt and has a large diameter portion threaded into the end of the bushing. The threads on both the small and large diameter portions of the pin are of the same hand but the pitch of the threads engaging the bolt is smaller than the pitch of the threads engaging the bushing so that rotation of the pin will only advance the bolt by the amount of the difference in the pitches of the two sets of threads. In this manner very fine thread adjustment is provided for projecting the bolt out of the bushing while a coarse thread adjustment is provided for threading the bushing through the arm. The bushing and pin have knobs on their ends to facilitate rotation, and friction brake means are provided to prevent unauthorized rotation of the bushing and pin.

The bolt engages the free end of the idler arm or lever on a rock shaft and positions this lever to accurately control the end feed position of the pawl mechanism carried by the lever. A tension spring pulls the idler lever against the end of the bolt.

It is then an object of this invention to provide a rapidly operated micrometer adjustment for pawl drive feed mechanism.

Another object of the invention is to provide a saw sharpening machine with a pawl drive that has coarse and fine adjustments for the end drive position of the pawl mechanism.

A specific object of the invention is to provide drive mechanism for saw sharpening machines having an oscillating lever carrying a screw mechanism with coarse and fine screw threaded adjustments to drive and vary the position of a feed pawl mechanism.

Another specific object of the invention is to provide a driving arm on the feed mechanism of a saw sharpening machine with adjusting mechanism having a bushing in coarse threaded relation with the arm and slideably supporting a bolt with a fine thread adjustment whereby the coarse threads can roughly position a pawl lever actuated by the driving lever while the fine threads can provide fine adjustments for the arm.

Other and further objects of this invention will become apparent to those skilled in this art from the following detailed description of the annexed sheet of drawings which, by way of a preferred example only, illustrates one embodiment of the invention.

IN THE DRAWINGS

BRIEF DESCRIPTION OF THE PREFERRED EMBODIMENT

Figure 1:
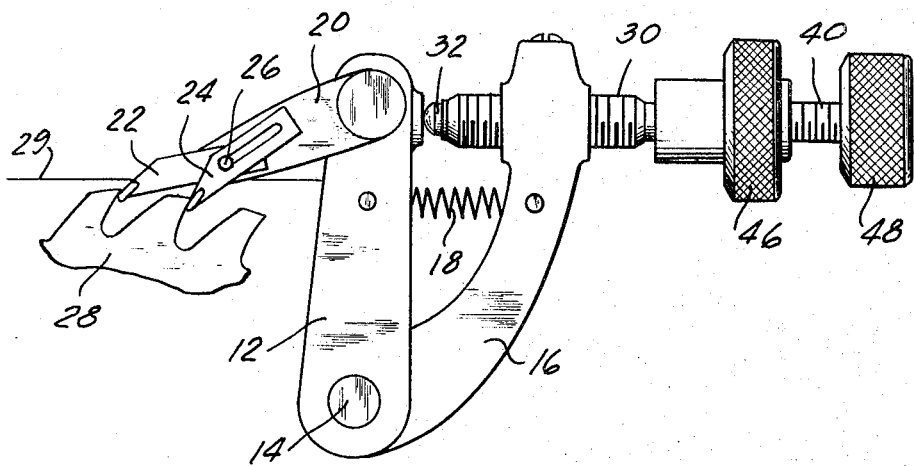
FIG. 1 is a somewhat diagrammatic elevational view of a device of this invention for adjusting or altering the end feed position of a circular saw on a saw sharpening machine.
Figure 2:
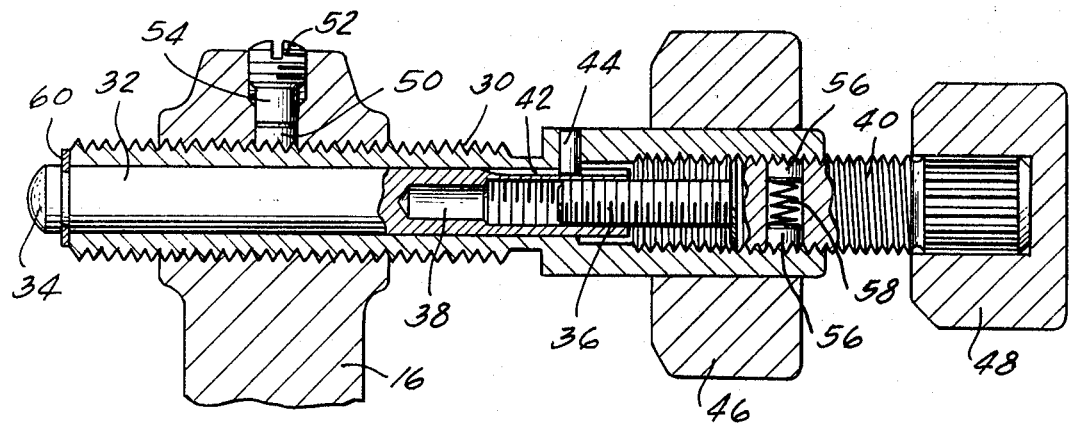
FIG. 2 is an enlarged longitudinal sectional view through the adjusting or altering mechanism.

The feed mechanism of this invention includes a first feed lever or arm 12 freely mounted on the feed shaft 14 of a saw sharpening machine (not shown). A second feed arm or lever 16 is fixedly mounted on the shaft 14. The shaft 14 is rocked or oscillated by a suitable drive mechanism such as an adjustable crank or the line (not shown). Both feed levers 12 and 16 are biased toward each other by a tension spring 18.

The first feed lever 12 carries a feed pawl holder 20 on the free end of which are adjustably mounted two feed pawls 22 and 24 by means of a clamping screw 26. These feed pawls 22 and 24 engage two consecutive teeth of a circular saw 28 thus guaranteeing that the circular saw will be pushed forward step-wise by one tooth pitch even if a tooth of the saw might be missing.

The feed pawl holder 20 is guided on a horizontal support 29 so that the feed pawls 22 and 24 do not drop any more than necessary into the gaps between the teeth of the saw 28.

The feed lever or arm 16 carries a threaded bushing 30 carrying therein an axially slideably stop bolt 32. This bolt 32 has a nose 34 engaging a pad on the first feed lever or arm 12 under the bias of the tension spring 18.

The stop bolt 32 is supported in the bushing 30 by a threaded pin 36 which is threaded into a threaded bore 38 on the inner end of the stop bolt. This pin 36 has an integral enlarged end head or bolt portion 40 threaded in the outer end of the bushing 30.

The stop bolt 32 has a longitudinal groove 42 in its inner end receiving a spring pressed pin extending radially through the bushing 30 so that the bolt 32 cannot rotate relative to the bushing 30.

The thread of the pin portion 36 and the thread of the enlarged head portion or bolt 40 are both right-handed but the pitch of the threads on the pin portion 36 is somewhat smaller than the pitch of the threads on the enlarged threaded bolt portion 40. By way of example the thread pitch of the threaded pin 36 can be 1 mm while the thread pitch of the threaded bolt 40 can be 1 ½ mm. In this case, the stop bolt 32 is advanced only by 0.5 mm in the bushing 30 when the threaded bolt 40 is rotated a full revolution in the threaded bushing 30. The external threads on the bushing 30 which are threaded through the lever 16 have a comparatively larger pitch of, for example, 2.5 mm so that the threaded bushing with each revolution advances the stop pin therein a distance of 2.5 mm.

A knurled control knob 46 is secured on the outer end of the bushing 30 and a similar knurled control knob 48 is secured on the outer end of the bolt portion 40.

Unintentional rotation of the threaded bushing 30 is provided by a friction brake arranged in a radial threaded bore of the lever 16 and has a piston made of plastic material or soft metal which is pressed by a setscrew 52 through a rubber plug 54. Tightening of the setscrew 52 will force the plastic or soft metal piston or plunger against the threaded exterior of the bushing 30 providing frictional resistance to rotation of the bushing by an amount determined by the tightening of the screw 52.

Unintentional movement of the bolt 32 in the bushing 30 is avoided by a friction brake carried in a transverse bore of the bolt portion 40 and composed of a pair of pistons or plungers 56 pressed by spring 58 away from each other and against the internal thread of the bushing 30.

The extent of projection of the bolt 32 beyond the sleeve 30 by means of rotation of the threaded bolt 40 is limited by the length of the internal thread of the bolt 32 and the threaded bushing. The extent of retraction of the bolt 32 into the bushing is limited by a snap ring 60 adjacent the nose 34 so that the pin 36 may not be unscrewed out of the bore 38 and the threaded bolt unscrewed out of the threaded bushing 30 unless the snap ring 60 is removed.

From the above descriptions it will be understood that the angular distance between the two feed levers or arms 12 and 16 can be varied in a simple manner and to a very wide degree with great accuracy. It should also be understood that the screw adjusting device need not necessarily be mounted on the feed lever 16 but can be mounted on the idler lever 12 if the space conditions on the saw sharpening machine make this advisable. In this reversed arrangement the threaded bushing 30 may be threaded through a bore of the first lever 12 and the nose 34 of the pin 32 may be held by the spring 18 against the lever 16. The arrangement of the drawings is preferred, however, since the control knobs 46 and 48 are more easily accessible.

Although minor modifications might be suggested by those versed in the art, it should be understood that I wish to employ within the scope of the patent granted hereon all such modifications as reasonably and properly come within the scope of my contribution to the art.

I claim as my invention:

1. A device for adjusting the end feed position of an oscillating feed mechanism which comprises a rock shaft, a first lever freely mounted on said shaft, a feed pawl mounted on said first lever, a second lever fixedly mounted on said rock shaft, a spring biasing the first lever towards the second lever, a bushing threaded through the second lever by means of coarse threads, a bolt slideable in the bushing engaging the first lever, and fine threads connecting the bolt and bushing whereby the bolt is quickly shifted by the coarse threads of the bushing and second lever to vary the spacing of the first and second levers and is then adjusted in the bushing by the fine threads to accurately position the first lever relative to the second lever.

2. The device of claim 1 wherein the bolt has an axial groove and the bushing has a pin extending into said groove to prevent rotation of the bolt in the bushing.

3. The device of claim 2 wherein the bolt has a threaded bore, a threaded pin is threaded in said bore and has an enlarged diameter portion threaded in the bushing.

4. The device of claim 3 wherein the thread pitch on the pin in the bolt is smaller than the thread pitch of the enlarged pin portion threaded in the bushing so that rotation of the pin will advance the bolt only a fraction of the amount of advancement of the pin in the bushing.

5. The device of claim 1 including a friction brake preventing unauthorized rotation of the bushing in the second lever and a second friction brake preventing unauthorized rotation of the pin in the bushing.

6. In a saw sharpening machine having a first lever, a pawl pivotally mounted on the first lever for engaging the teeth of a circular saw to be sharpened by the machine, and a second lever driving the first lever to advance the pawl for rotating the circular saw step-by-step, the improvement of a device for quickly and accurately positioning the end drive position of the pawl including a bushing threaded through the second lever, a bolt slideable in the bushing and having a nose engaging the pawl carrying lever to drive the lever and a pin threaded in the bushing and in the bolt to position the bolt axially in the bushing.

7. The saw sharpening machine of claim 6 wherein the threads connecting the bolt and pin and threads connecting the pin and bushing are of the same hand but of different pitch so that rotation of the pin only advances the bolt in an amount equal to the difference in pitch of the two sets of threads.

* * * * *